United States Patent
Zaugg et al.

(10) Patent No.: US 7,046,188 B2
(45) Date of Patent: May 16, 2006

(54) SYSTEM AND METHOD FOR TRACKING BEAM-ASPECT TARGETS WITH COMBINED KALMAN AND PARTICLE FILTERS

(75) Inventors: David A. Zaugg, Tucson, AZ (US); Alphonso A. Samuel, Tucson, AZ (US); Donald E. Waagen, Tucson, AZ (US); Harry A. Schmitt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 180 days.

(21) Appl. No.: 10/640,993

(22) Filed: Aug. 14, 2003

(65) Prior Publication Data

US 2005/0035900 A1 Feb. 17, 2005

(51) Int. Cl.
G01S 13/526 (2006.01)
G01S 13/18 (2006.01)
G01S 13/528 (2006.01)

(52) U.S. Cl. .......................... 342/95; 342/89; 342/94; 342/159; 342/160; 342/163; 342/175; 342/195

(58) Field of Classification Search ............ 342/61–70, 342/73–103, 159–164, 175, 189–197
See application file for complete search history.

(56) References Cited

U.S. PATENT DOCUMENTS 3,935,572 A * 1/1976 Broniwitz et al. ............ 342/80
3,952,304 A * 4/1976 Broniwitz et al. ............ 342/95
5,530,447 A * 6/1996 Henderson et al. ........... 342/70

OTHER PUBLICATIONS

B. Saulson et al., "Comparison of Nonlinear Estimation for Ballistic Missile Tracking"; George Mason University; Fairfax, Virginia; No publication listed; no date given.*

Z. Khan et al., "An MCMC-based Particle Filter for Tracking Multiple Interacting Targets"; Georgia Institute of Technology; Atlanta, Georgia; No publication listed; no date given.*
Z. Khan et al., "Efficient Particle Filter-Based Tracking of Multiple Interacting Targets Using an MRF-based Motion Model"; Georgia Institute of Technology; Atlanta, Georgia; No publication listed; no date given.*
M.S. Arulampslam et al., "A Tutorial on Particle Filters for Online Nonlinear/Non-Gaussian Bayesian Tracking"; IEEE Transactions on Signal Processing; vol. 50, No. 2; pp. 174-188; Feb. 2002.*
M. Orton et al., "A Bayesian Approach to Tracking Multiple Targets Using Sensor Arrays and Particle Filters"; IEEE Transactions on Signal Processing; vol. 50, No. 2; pp. 216-223; Feb. 2002.*
S. Herman, "A Particle Filtering Approach to Joint Passive Radar Tracking and Target Classification"; University of Illinois; Urbana-Champaign, Illinois; the year 2002.*
Neil Gordon and Branko Ristic "Tracking Airborne Targets Occasionally Hidden in the Blind Doppler", no date given, no publication given.

* cited by examiner

*Primary Examiner*—Bernarr E. Gregory
(74) *Attorney, Agent, or Firm*—Thomas J. Finn; Leonard A. Alkov; Karl A. Vick (57) ABSTRACT

Systems and methods of tracking a beam-aspect target are provided. In embodiments, a target is tracked with a Kalman filter while detections are received. After a detection is missed, the Kalman filter may be concurrently propagated with a blind-zone particle filter until a probability that the target is in a blind zone exceeds a threshold. When the probability exceeds the threshold, the Kalman filter may refrain from further propagating. After a gated detection is received, the blind-zone particle filter and an unrestricted-zone particle filter may be concurrently propagated while a probability that the target is in an unrestricted zone exceeds a threshold. The system may return to tracking with the Kalman filter when a covariance of the unrestricted-zone particle filter falls below a predetermined covariance.

31 Claims, 3 Drawing Sheets

SYSTEM AND METHOD FOR TRACKING BEAM-ASPECT TARGETS WITH COMBINED KALMAN AND PARTICLE FILTERS

LICENSE RIGHTS

This invention was made with United States Government support under F49620-02-C-0055 awarded by the Defense Advanced Research Projects Agency (DARPA). The United States Government may have certain rights in this invention.

TECHNICAL FIELD

Embodiments of the present invention pertain to active target-tracking systems including ranging systems that may measure range and track beam-aspect targets as well as active systems that measure angle and/or velocity of targets. Embodiments of the present invention also pertain to statistical signal processing, and in particular, to signal processing with Kalman and particle filters. Embodiments of the present invention also pertain to tracking targets occasionally hidden in a Doppler-blind zone.

BACKGROUND

Many conventional target-tracking systems use a Kalman filter to track targets. During tracking, a target may occasionally be hidden in a Doppler-blind zone. A Doppler-blind zone is a region where there is little or no Doppler discriminant between the target and clutter returns. When a target moves into a Doppler-blind zone, clutter may mask any useful measurements.

One difficulty with these conventional target-tracking systems for targets that are occasionally hidden in a Doppler-blind zone is that track continuity is difficult to maintain. For example, when a target moves into a Doppler-blind zone, the target may remain there long enough for a tracker to lose it. Furthermore, sufficient time may elapse while the target is in the Doppler-blind zone that it may be impossible to reacquire and/or intercept the target when it does emerges from the blind zone. The loss of the target and/or the reacquisition delay can become a significant danger in some situations, especially when the target enters a blind zone repeatedly or at a critical time.

Thus, there are general needs for improved systems and methods that track targets. There are also needs for tracking systems and methods that help maintain track continuity of beam-aspect targets. There are also needs for tracking systems and methods that more quickly reacquire beam-aspect targets emerging from a blind zone.

SUMMARY OF THE INVENTION

In embodiments, a target is tracked with a Kalman filter while detections are received. After a detection is missed, the Kalman filter may be concurrently propagated with a blind-zone particle filter until a probability that the target is in a blind zone exceeds a predetermined threshold. When the probability exceeds the threshold, the Kalman filter may refrain from further propagating. After a gated detection is received, the blind-zone particle filter and an unrestricted-zone particle filter may be concurrently propagated until a probability that the target is in an unrestricted zone exceeds a predetermined threshold. The system may return to tracking with the Kalman filter when a covariance of the unrestricted-zone particle filter falls below a predetermined covariance.

In some embodiments, the blind-zone particle filter may be initialized after the detection is missed with state information from the Kalman filter and randomly generated particles based on an error covariance matrix of the Kalman filter. The unrestricted-zone particle filter may be initialized after the gated detection is received by selecting a set of unrestricted-zone particles from the unrestricted-zone particles propagated by the unrestricted-zone particle filter. The selected set of unrestricted-zone particles may be outside the blind zone. Prior to returning to tracking with the Kalman filter, the Kalman filter may be initialized with a mean and covariance calculated from statistics of the unrestricted-zone particle filter when the covariance falls below the predetermined covariance.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

In accordance with some embodiments, target-tracking systems and methods of the present invention may use both a Kalman filter and one or more particle filters during transitions of a target between an unrestricted zone and a Doppler-blind zone. A second particle filter may be used prior to a transition back to tracking the target with the Kalman filter as the target emerges from the Doppler-blind zone.

Figure 1:
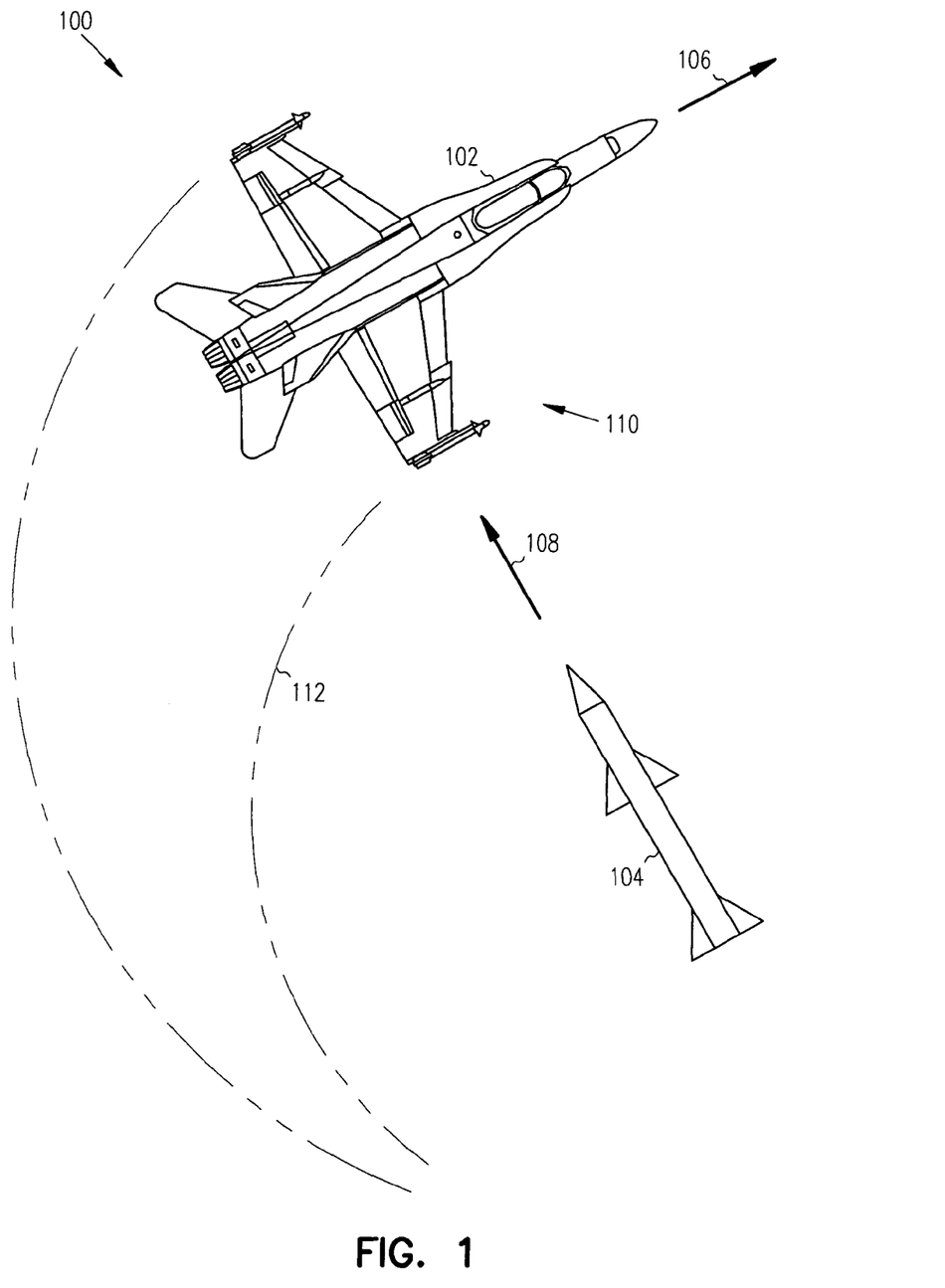
FIG. 1 illustrates an operational environment in which some embodiments of the present invention may be practiced.

FIG. 1 illustrates an operational environment in which embodiments of the present invention may be practiced. Operational environment 100 includes target 102 moving in direction 106. Operational environment 100 also includes target tracker 104 which may be tracking target 102 as target 102 moves along flight path 112.

In embodiments, target tracker 104 may track target 102 with one or more Doppler systems for range tracking, elevation tracking and/or azimuth tracking. In some situations, target 102 may enter a Doppler-blind zone, such as zone 110, in which clutter may mask useful measurements by target tracker 104. Beam aspect tracking refers to situations in which a range-rate of the target is the same as that of the clutter. This may occur when, for example, the target is moving substantially perpendicular to target tracker 104, and may also occur with targets that are hidden in altitude-return clutter. Target tracker 104 may comprise an active target-tracking system, including a ranging system that may measure and/or estimate a target's range. Target tracker 104 may also comprise an active system that may measure and/or estimate a target's angle and velocity.

In accordance with embodiments of the present invention, target tracker 104 may include a target-tracking system which improves the tracking of beam-aspect targets. In accordance with some embodiments, target tracker 104 may improve track continuity of beam-aspect targets. In accordance with some embodiments, target tracker 104 may more quickly reacquire beam-aspect targets emerging from a blind zone.

In accordance with embodiments of the present invention, target 102 may include any moving object including aircraft, spacecraft, and missiles. In accordance with embodiments of the present invention, target tracker 104 may include any target-tracking system, including ground-based systems as well as aircraft, spacecraft and missiles configured to track a target.

Figure 2:
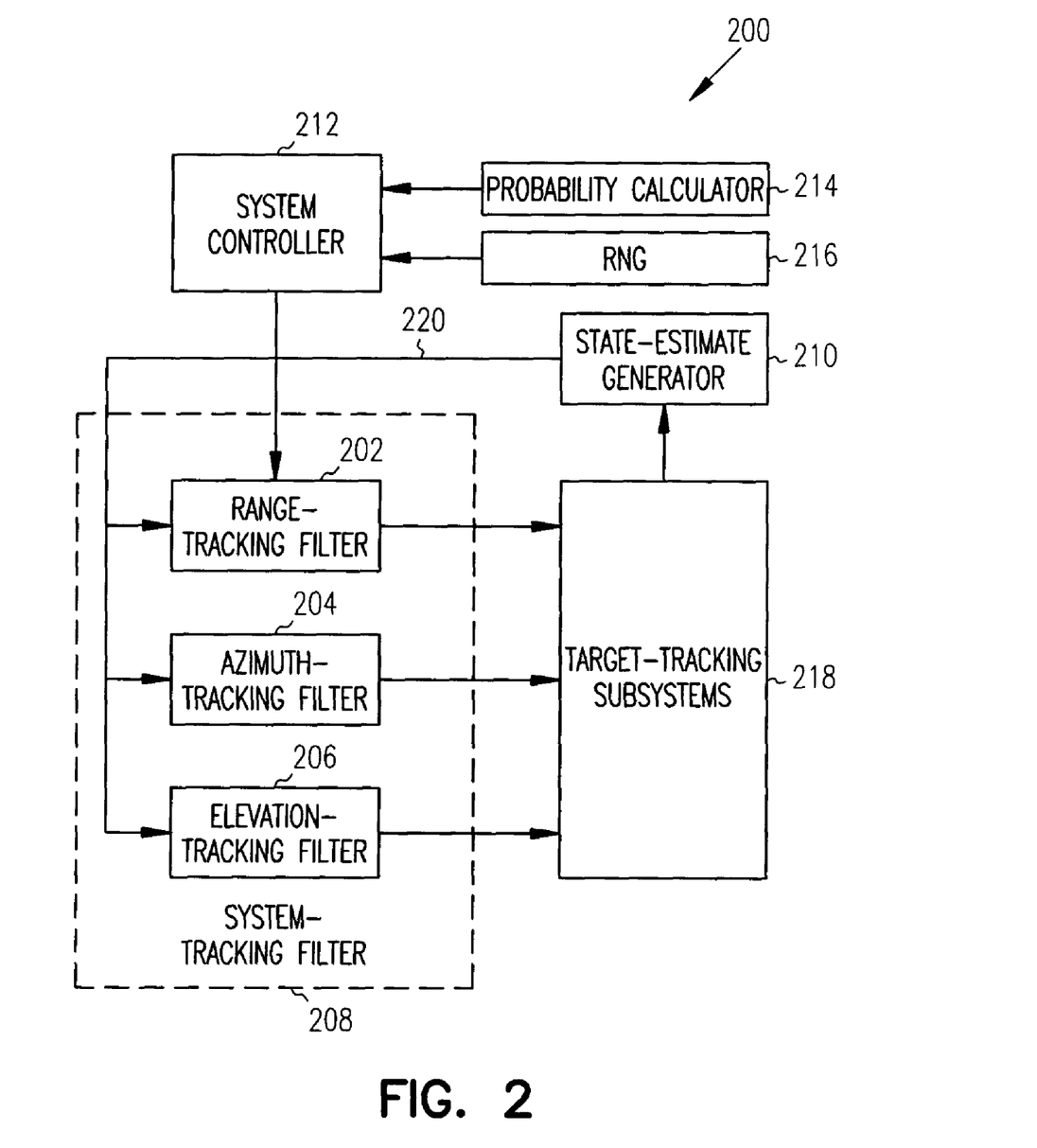
FIG. 2 is a functional block diagram of an active system in accordance with some embodiments of the present invention.

FIG. 2 is a functional block diagram of an active system in accordance with embodiments of the present invention. Active system 200 may be suitable for use by a target tracker, such as target tracker 104 (FIG. 1) although other target trackers may also be suitable. Active system 200 may comprise an active target-tracking system, including a ranging system that may measure and/or estimate a target's range. Active system 200 may also comprise an active system that may measure and/or estimate a target's angle and velocity.

Active system 200 includes system-tracking filter 208, state-estimate generator 210 to provide state estimates 220 to system-tracking filter 208, and system controller 212 to control the operations of system 200. Active system 200 also includes tracking subsystems 218 for performing the various aspects of target tracking within a target tracker including providing information to state-estimate generator 210 for use in generating state estimates 220. In some embodiments, state-estimate generator 210 may generate a state vector comprising a position component, a velocity component and/or an acceleration component which may be estimated from information provided by subsystems 218. System tracking filter 208 may provide one or more estimates of locations of a target being tracked to subsystem 218.

In some embodiments, system tracking filter 208 may comprise range-tracking filter 202, azimuth-tracking filter 204 and elevation-tracking filter 206 for providing range, azimuth and elevation location estimates for a target, although the scope of the invention is not limited in this respect.

In some embodiments, range-tracking filter 202 may comprise a Kalman filter, an unrestricted-zone particle filter and a blind-zone particle filter. In some additional embodiments, azimuth-tracking filter 204 and elevation-tracking filter 206 may also comprise a Kalman filter, an unrestricted-zone particle filter and a blind-zone particle filter, although the scope of the invention is not limited in this respect.

In some embodiments, system 200 may be applicable to altitude returns and may track targets hidden in altitude-return clutter. In these embodiments, information about the extent of the altitude-return clutter may be incorporated into the filters. In some embodiments, system 200 may track targets lost due to multi-path fading in which the width of the fade may be calculated based on geometry.

Figure 3:
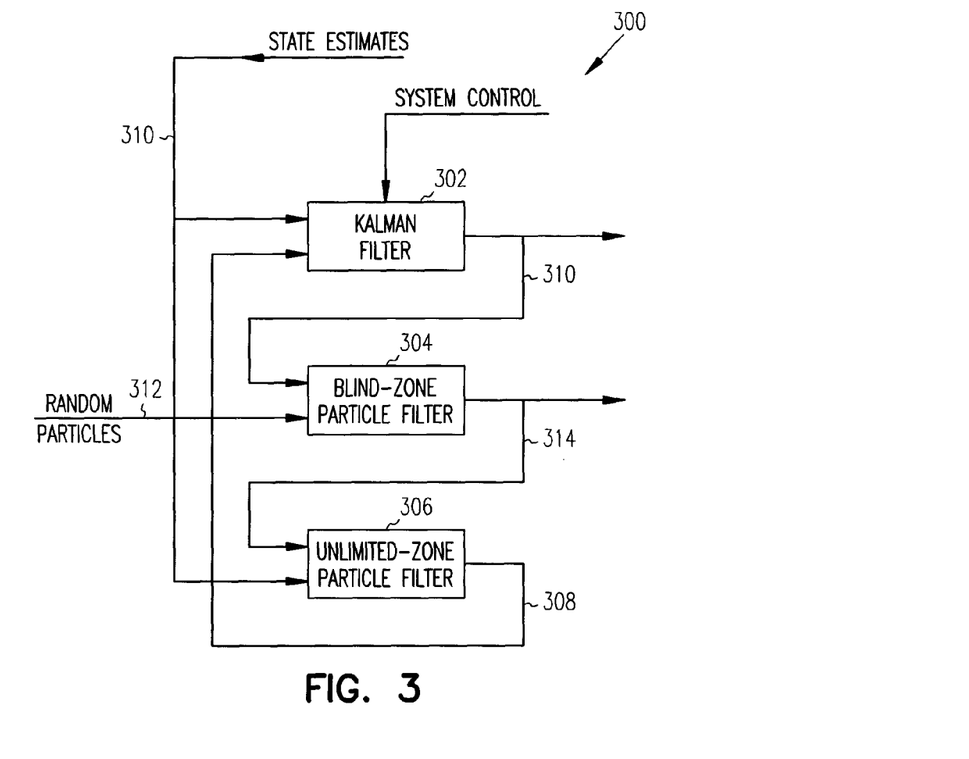
FIG. 3 is a block diagram of a tracking filter in accordance with some embodiments of the present invention.

FIG. 3 is a block diagram of a tracking filter in accordance with embodiments of the present invention. Tracking filter 300 may be suitable for use as one or more of tracking filters 202, 204 and 206 (FIG. 2) although other tracking filters may also be suitable. Tracking filter 300 may comprise Kalman filter 302, unrestricted-zone particle filter 304 and blind-zone particle filter 306.

In accordance with some embodiments, Kalman filter 302 may track a target while detections are received. Blind-zone particle filter 304 may concurrently propagate with the Kalman filter after a detection is missed and while a probability that the target is in a blind zone exceeds a threshold. Unrestricted-zone particle filter 306 may concurrently propagate with the blind-zone particle filter after a gated detection is received and while a probability that the target is in an unrestricted zone exceeds a threshold. In embodiments, Kalman filter 302 may return to tracking the target when a covariance of the unrestricted-zone particle filter falls below a predetermined covariance.

Referring back to FIG. 2, in some embodiments, active system 200 may include probability calculation circuit 214 to calculate the probability that the target is in the blind zone. Probability calculation circuit 214 may also calculate the probability that the target is in the unrestricted zone. The calculation of these probabilities is discussed in more detail below.

In some embodiments, active system 200 may also utilize a random number generator (RNG) 216 for use when system controller 212 initializes blind-zone particle filter 304 with state information 316 from Kalman filter 302 with randomly generate particles 312 based on an error covariance matrix of Kalman filter 302. Blind-zone particle filter 304 may also include information known about the blind zone of the tracking system. Information may be available to determine the possible extent of the blind zone. This information may be inferred from the performance envelope of expected targets and/or parameters of specific sensor systems.

In some embodiments, system controller 212 may initialize unrestricted-zone particle filter 306 with unrestricted-zone particles 314 from blind-zone particle filter 304. The unrestricted-zone particles may be outside the blind zone and unrestricted-zone particle filter 306 may be gated and updated with measurements 310 from one or more gated detections.

In some embodiments, system controller 212 may initialize Kalman filter 302 with a mean and covariance calculated from statistics 308 from the unrestricted-zone particle filter 306 when the covariance falls below the predetermined covariance.

In some embodiments, Kalman filter 302 may comprise three functionally separate Kalman filters. In these embodiments, each of the Kalman filters may have a position state, a velocity state, and an acceleration state. In these embodiments, each of these three functionally separate Kalman filters may track target range, target azimuth and target elevation and may together serve as filters 202, 204 and 206. Similarly, particle filters 304 and 306 may each comprise three functionally separate particle filters having a position state, a velocity state, and an acceleration state.

In some alternate embodiments, azimuth-tracking filter 204 may include an azimuth Kalman filter, an azimuth unrestricted-zone particle filter, and an azimuth blind-zone particle filter. Elevation-tracking filter 206 may include an elevation Kalman filter, an elevation unrestricted-zone particle filter, and an elevation blind-zone particle filter. The Kalman filters, the blind-zone particle filters and the unrestricted-zone particle filters of azimuth-tracking filter 204 and elevation-tracking filter 206 may correspond to Kalman filter 302, blind-zone particle filter 304 and unrestricted-zone particle filter 306, respectively.

Although active system 200 and system-tracking filter 300 are illustrated as having several separate functional elements, one or more of the functional elements may be combined and may be implemented by combinations of software-configured elements, such as processing elements including digital signal processors (DSPs), and/or other hardware elements such as logic circuitry. For example, elements of system 200 may include one or more processing elements, which may comprise one or more microprocessors, DSPs, application specific integrated circuits (ASICs), and combinations of various hardware and logic circuitry for performing at least the functions described herein.

In some embodiments, the various filters may comprise a combination of logic circuitry, firmware and software-configure processing elements to implement one or more filter algorithms and combinations thereof. For example, a Kalman filter may implement one or more minimal mean-square-error (MSE) filter algorithms, and the particle filters may implement Bayesian tracking filter algorithms, which may be implemented without restriction on linearity of Gaussian statistics.

In accordance with embodiments of the present invention, Kalman filter 302, blind-zone particle filter 304 and unlimited-zone particle filter 306 may be propagated using polar coordinates, although the scope of the invention is not limited in this respect. In other embodiments, the filters may be propagated in other coordinate systems, including Cartesian coordinates and combinations thereof.

Figure 4:
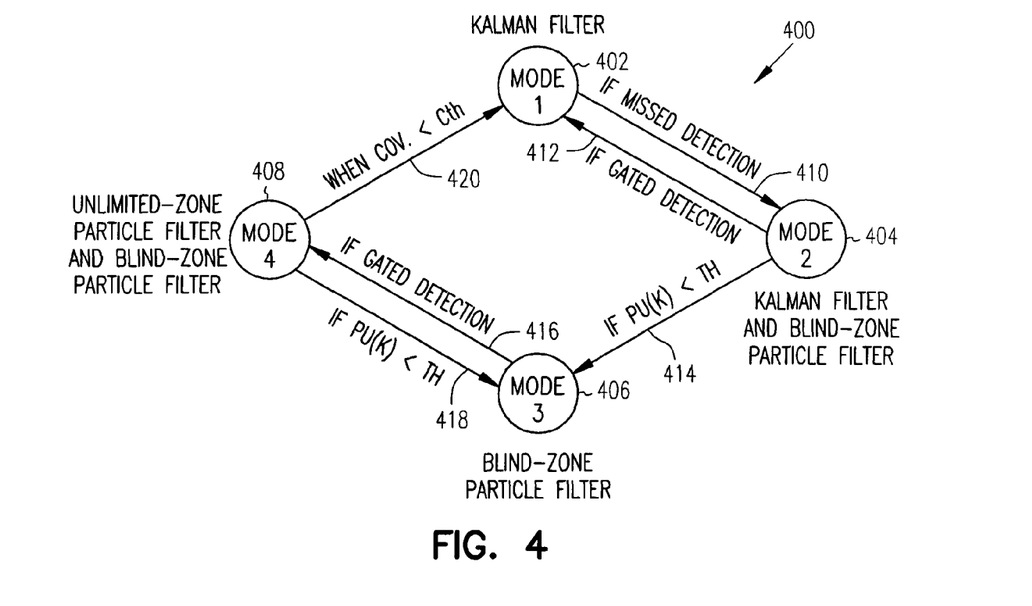
FIG. 4 is a mode diagram of a beam-aspect target-tracking system in accordance with some embodiments of the present invention.

FIG. 4 is a mode diagram of a beam-aspect target-tracking system in accordance with embodiments of the present invention. As illustrated by tracking-filter mode diagram 400, a tracking system may be in one of four tracking modes. The system operates in mode one when the target is in an unrestricted zone. The system operates in mode two, which is a transition mode, when the target may be transitioning to a Doppler-blind zone. The system operates in mode three when the target is in the blind zone. The system operates in mode four, which is also a transition mode, when the target may be emerging from the blind zone. Mode one is designated in FIG. 4 by reference numeral 402, mode two is designated by reference numeral 404, mode three is designated by reference numeral 406, and mode four is designated by reference numeral 408.

In mode one, the system may track a target with a Kalman filter, such as Kalman filter 302 (FIG. 3), while detections are received. After a detection is missed, the system may transition to mode two as indicated by transition 410. In mode two, the system may concurrently propagate the Kalman filter and a blind-zone particle filter, such as blind-zone particle filter 304 (FIG. 3). The system may remain in mode two until a probability that the target is in a blind zone exceeds a threshold or until a gated detection is received. When a gated detection is received in mode two, the system may transition to mode one as indicated by transition 412. When the probability that the target is in the blind zone exceeds the threshold, or when a probability that the target is in an unrestricted zone is less than a threshold, the system may transition to mode three as indicated by transition 414. In embodiments, the unrestricted zone may be defined as everywhere that is not within a blind zone.

When the system enters mode three, the system may refrain from further propagating the Kalman filter. During mode three, the blind-zone particle filter may continue to be propagated. During mode three, if a gated detection is received, the system may transition to mode four as indicated by transition 416. In mode four, the blind-zone particle filter may be concurrently propagated with an unrestricted-zone particle filter, such as unrestricted-zone particle filter 306 (FIG. 3). During mode four, when a probability that the target is in an unrestricted zone falls below a threshold, the system may transition back to mode three as indicated by transition 418. During mode four, the system may return to mode one for tracking the target with the Kalman filter when a covariance of the unrestricted-zone particle filter falls below a predetermined covariance as indicated by transition 420.

In some embodiments, the blind-zone particle filter may be initialized after the detection is missed in mode one with state information from the Kalman filter and randomly generated particles based on an error covariance matrix of the Kalman filter. The unrestricted-zone particle filter may be initialized after a gated detection is received when the system is in mode three with a set of unrestricted-zone particles from the blind zone from the blind-zone particle filter. The unrestricted-zone particles may be selected to comprise particles outside the blind zone. During mode four, the unrestricted-zone particle filter may gate and update with measurements from one or more gated detections. This may help collapse the filter covariance of the unrestricted-zone particle filter more quickly for switching back to mode one more quickly. Prior to returning to tracking with the Kalman filter after transitioning from mode four, the Kalman filter may be initialized with a mean and covariance calculated from statistics from the unrestricted-zone particle filter when the covariance falls below the predetermined covariance in mode four.

In some embodiments, during mode two, the probability that the target is in the unrestricted zone and/or the probability that the target is in the blind zone, may be calculated based on a number of missed gated detections. In mode four, the probability that the target is in the unrestricted zone and/or the probability that the target is in the blind zone, may be calculated based on a number of missed gated detections after a gated detection is received in mode three.

In accordance with some embodiments, the probability that the target is in the unrestricted zone (i.e., pU(k)) and the probability that the target is in the blind zone (i.e., pBZ(k)) may be updated with each iteration (i.e., k) of the filter. In mode one, when a detection is received, pU(k) may be set to one and pBZ(k) may be set to zero. When a detection is missed in mode one or when no ungated detections are received in mode two, pU(k) may be set to (1−Ps) pU(k−1) and pBZ(k) may be set to 1−pU(k). "Ps" may be a rate constant selected based on system requirements, and "k−1" refers to a prior iteration of the filter. In mode two, when a detection is received, pU(k) may be reset to one and pBZ(k) may be reset to zero. During mode three while there are no gated detections, pU(k) may be zero and pBZ(k) may be one. During mode three when a gated detection is received and during mode four when gated detections are received, pBZ(k) may be set to (1−Ps) pBZ(k−1) and pU(k) may be set to 1−pBZ(k). During mode four, when no ungated detections are received, pU(k) may be set to (1−Ps) pU(k−1) and pBZ(k) may be set to 1−pU(k).

In some embodiments, mode two may help make the transition between the Kalman filter and the blind-zone particle filter smooth and to allow for a graceful recovery to mode one if it is determined that a missed detection does not indicate a beam-aspect target. In mode two, the Kalman filter may be coasted since there should be no gated detections. If a detection is gated in mode two, the system may transition back to mode one as indicated by transition 412.

When the blind-zone particle filter is initialized after the system transitions to mode two, a set of particles for initializing the blind-zone particle filter may be generated from an assumed prior Gaussian distribution where the mean is the last estimate of the Kalman filter with the range rate set to zero. The covariance of the set of particles may be the last error covariance matrix of the Kalman filter. In mode two, since there are no detections without switching to mode one, the blind-zone particle filter may be propagated without measurements for its update step. Because mode two covers a transition to the blind zone, the likelihood function for the range filter may be Gaussian with a mean at zero range rate, and the standard deviation may be set to one third of the single-sided blind zone width. This may provide for less abrupt edges for the blind zone during transition.

In some situations, the initial use of a Gaussian distribution may be less useful as a blind-zone boundary, such as when the range rate is set to zero when the particles are initialized. In other situations, the range rate from the Kalman filter operating in mode one may be used, however in these cases, there may be no particles with a small enough range rate to initially fall within the blind zone. Therefore, a distribution with less abrupt edges may be useful for the transition.

In mode three, a prediction step for the blind-zone particle filter may occur as with a conventional particle filter, however the update step may be slightly different than it would be for an unrestricted-zone particle filter that tracks with measurements. Since no measurements are used for propagating the blind-zone particle filter in mode three, a priori information about the extent of the blind zone may be used to determine the weights for the update step. The weights may be selected to be "one" for the blind zone extent and "zero" everywhere else. In this way, only the range rate is being constrained and the particles may be allowed to expand in every other direction without bound. This is similar to the function of a Kalman filter without measurements, except that the range rate uncertainty is constrained to grow no larger than the extent of the Doppler-blind zone. These blind-zone particles may be used to create the covariance for the gating operation of the blind-zone particle filter in the event that a measurement is received and the filter transitions to mode four, as indicated by transition 416.

In mode four, the blind-zone particle filter propagated in mode three continues to be propagated and the unrestricted-zone particle filter is initialized when mode four is entered. The blind-zone particle filter may ignore the measurements from the gated detections received and may continue to track the blind zone. This allows a graceful transition back to the blind zone as illustrated by transition 418 in the event that the system decides the unrestricted-zone particle filter is not tracking the intended target, if any target at all. If there are few enough detections in mode four, the system may transition back to mode three as illustrated by transition 418. As more detections are received and gated in mode four, the probability that the target is in the unrestricted zone (i.e., pU) increases and a transition back to mode three becomes less likely. The use of the unrestricted-zone particle filter in mode four may help to rapidly reduce the estimate uncertainty for switching back to the Kalman filter.

In some embodiments, the unrestricted-zone particle filter may be initialized by copying blind-zone particles from the blind-zone particle filter. The unrestricted-zone particle filter may be updated using measurements and evaluating the likelihood function. In some embodiments, as an additional help to the range filter, the system may reject the particles in the blind zone. Accordingly, resampling by the unrestricted-zone particle filter may quickly collapse the spread of the particles around the measurements. When the covariance of these particles is small enough (e.g., below a predetermined covariance threshold) and a detection is gated, the system may transition to mode one as indicated by transition 420. After transition 420 to mode one, the Kalman filter may be initialized with a mean and covariance calculated from statistics of unrestricted-zone particle filter from mode four.

In embodiments, mode diagram 400 may be applicable to systems using range, azimuth and elevation tracking filters, such as filters 202, 204 and 206 (FIG. 2). In these embodiments, transitions between modes and initializations may occur simultaneously for each of the tracking filters. For example, for transitions from mode four to mode one, the covariances of the particles of the unlimited blind zone filters of the range, azimuth and elevation tracking filters should be low enough (e.g., below one or more predetermined thresholds) before switching to the Kalman filters of the range, azimuth and elevation tracking filters utilized in mode one.

In accordance with embodiments of the present invention, the Kalman filters, such as Kalman filter 302 (FIG. 3), may be propagated in prediction and update steps. An example of suitable, prediction equations for the state and error covariance matrix may be:

$$\hat{x}(k+1|k)=\Phi\hat{x}(k|k),$$

$$P(k+1|k)=\Phi P(k|k)\Phi^T+Q, \quad (1)$$

where $\hat{x}$ is the state estimate, P is the error covariance matrix, $F^T$ is the state transition matrix, and Q is the covariance of the process noise. A suitable measurement equation may be:

$$y(k)=Hx(k)+v(k),$$

where y is the measurement, H is the measurement matrix, and v is the measurement noise with covariance $R_c$. The Kalman filter may be updated by computing the Kalman gain and using it and the measurement to update the state and the error covariance matrix:

$$K(k)=P(k|k-1)H^T[HP(k|k-1)H^T+R_c]^{-1},$$

$$\hat{x}(k|k)=\hat{x}(k|k-1)+K(k)[y(k)-H\hat{x}(k|k-1)],$$

$$P(k|k)=[I-K(k)H]P(k|k-1),$$

where K is the Kalman gain. The matrices may be defined as follows:

$$\Phi = \begin{bmatrix} 1 & T & \frac{T^2}{2} \\ 0 & 1 & T \\ 0 & 0 & 1 \end{bmatrix}$$

$$Q_R = \frac{2\sigma_{q,R}^2}{\tau} \begin{bmatrix} \frac{T^5}{20} & \frac{T^4}{8} & \frac{T^3}{6} \\ \frac{T^4}{8} & \frac{T^3}{3} & \frac{T^2}{2} \\ \frac{T^3}{6} & \frac{T^2}{2} & T \end{bmatrix},$$

-continued $$Q_{AZ,EL} = \frac{2\sigma_{q,AZ,EL}^2}{\tau R^2} \begin{bmatrix} \frac{T^5}{20} & \frac{T^4}{8} & \frac{T^3}{6} \\ \frac{T^4}{8} & \frac{T^3}{3} & \frac{T^2}{2} \\ \frac{T^3}{6} & \frac{T^2}{2} & T \end{bmatrix},$$

$$H_R = \begin{bmatrix} 1 & 0 & 0 \\ 0 & 1 & 0 \end{bmatrix},$$

$$H_{AZ,EL} = \begin{bmatrix} 1 & 0 & 0 \end{bmatrix},$$

$$R_{c,R} = \begin{bmatrix} \sigma_{r,R}^2 & 0 \\ 0 & \sigma_{r,R}^2 \end{bmatrix},$$

$$R_{c,AZ,EL} = \sigma_{r,AZ,EL}^2,$$

where $s_q$ is the maneuver standard deviation, $s_r$ is the measurement standard deviation, t is the maneuver time constant, T is the iteration time interval, and R is the range.

In accordance with embodiments, the structure of particle filters 304 (FIG. 3) and 306 (FIG. 3) may be similar to that of Kalman filter 302 (FIG. 3), however particle filters 304 (FIG. 3) and 306 (FIG. 3) may propagate a probability density function (pdf) instead of the mean and second moment. The particles may be state vectors, and in combination, may make up the support of the pdf. A weight may be associated with each particle and may be the value of the pdf at the location of that particle. The estimate of a particle filter at any given time may be the mean of the particles. A covariance may be calculated directly from the particles. In accordance with embodiments, the particles of the particle filters may propagate in a manner similar to a Kalman filter in accordance with a prediction and update step.

In accordance with some embodiments of the present invention, particle filter 304 (FIG. 3) may be initialized with an assumed prior distribution, from which all of the particles are drawn at random. Since the measurement and process noise are assumed to be Gaussian, so is the prior distribution. These initial particles may be fed into the prediction step. This step may sample the density $P(x_k|x_{k-1})$, which may be accomplished by running each particle through an equation similar to the prediction equation above for the Kalman filter:

$$x_i(k+1|k) = \Phi x_i(k|k) + w_i(k),$$

where w(k) is the process noise with covariance Q.

The update step has two parts. First the particles are weighted according to the likelihood function:

$$w_i(k) \propto p(z(k)|\hat{x}_i(k)),$$

where $w_i(k)$ are the weights and z(k) is the measurement. The measurement is gated by calculating the statistics of the particles directly. When propagating within the Doppler-blind zone, this function may be uniform over the limits of the blind zone. When outside of the Doppler-blind zone, the likelihood function is Gaussian with mean z(k) and covariance $R_c$. The second step in the update process includes resampling the particles according to the weights. This can be done in O(N) operations, where N is the number of particles, using order statistics, as discussed by Pitt, M. K., Shephard, N., "Filtering Via Simulation: Auxiliary Particle Filters," *Journal of the American Statistical Association*, vol. 94, pp. 590–599, 1999.

Including the process noise in the prediction step may help avoid degeneration of the particle set. The resampling algorithm may create copies of existing particles and may remove other particles such that the resulting set of particles may be distributed according to the weights. This resampling may result in a degenerated set since the particles may become substantially identical after enough iterations. Thus, the addition of process noise in the prediction step may help with proper filter function.

Thus improved systems and methods that track targets have been described. Tracking systems and methods that help maintain track continuity of track beam-aspect targets have also been described. Tracking systems and methods that more quickly reacquire beam-aspect targets emerging from a blind zone have also been described.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method of tracking a beam-aspect target comprising:
   tracking a target with a Kalman filter while a plurality of detections occur within a gate over a period of time;
   when an absence of further detections occurs within the gate following the plurality of detections, concurrently propagating the Kalman filter and a blind-zone particle filter until a probability that the target is in a blind zone exceeds a threshold;
   after a gated detection is received, concurrently propagating the blind-zone particle filter and an unrestricted-zone particle filter while a probability that the target is in an unrestricted zone exceeds a threshold; and
   returning to tracking the target with the Kalman filter when a covariance of the unrestricted-zone particle filter falls below a predetermined covariance.

2. The method of claim 1 wherein the probability that the target is in the blind zone is calculated based on a number of missed gated detections during the concurrent propagating of the Kalman filter and the blind-zone particle filter.

3. The method of claim 1 wherein the probability that the target is in the unrestricted zone is calculated based on a number of missed detections after the gated detection is received during the concurrent propagating the blind-zone particle filter and the unrestricted-zone particle filter.

4. The method of claim 1 further comprising initializing the Kalman filter with a mean and covariance calculated from statistics from the unrestricted-zone particle filter when the covariance falls below the predetermined covariance.

5. The method of claim 1 further comprising initializing the blind-zone particle filter with state information from the Kalman filter and randomly generated particles based on an error covariance matrix of the Kalman filter with a range-rate set to zero.

6. The method of claim 1 further comprising initializing the unrestricted-zone particle filter with unrestricted-zone particles from the blind-zone particle filter, the unrestricted-zone particles being outside the blind zone.

7. The method of claim 6 wherein propagating the unrestricted-zone particle filter comprises gating and updating with measurements from one or more gated detections.

8. The method of claim 1 further comprising refraining from further propagating the Kalman filter when the probability that the target is in the blind zone exceeds the threshold.

9. The method of claim 8 wherein concurrently propagating the blind-zone particle filter and the unrestricted-zone particle filter comprises concurrently propagating the blind-zone particle filter and the unrestricted-zone particle filter after a gated detection is received during the propagating of the blind-zone particle filter.

10. The method of claim 1 wherein the probability that the target is in the blind zone is calculated based on a number of missed gated detections during the concurrent propagating of the Kalman filter and the blind-zone particle filter,
wherein the probability that the target is in the unrestricted zone is calculated based on a number of missed detections after the gated detection is received during the concurrent propagating the blind-zone particle filter and the unrestricted-zone particle filter.

11. The method of claim 10 further comprising:
initializing the Kalman filter with a mean and covariance calculated from statistics from the unrestricted-zone particle filter when the covariance falls below the predetermined covariance;
initializing the blind-zone particle filter with state information from the Kalman filter and randomly generated particles based on an error covariance matrix of the Kalman filter with a range-rate set to zero; and
initializing the unrestricted-zone particle filter with unrestricted-zone particles from the blind-zone particle filter, the unrestricted-zone particles being outside the blind zone.

12. An active tracking system comprising:
a Kalman filter to track a target while a plurality of detections occur within a gate over a period of time;
a blind-zone particle filter to concurrently propagate with the Kalman filter when an absence of detections occurs with the gate following the plurality of detections until a probability that the target is in a blind zone exceeds a threshold;
an unrestricted-zone particle filter to concurrently propagate with the blind-zone particle filter after a gated detection is received and while a probability that the target is in an unrestricted zone exceeds a threshold; and
a controller to return the Kalman filter to tracking the target when a covariance of the unrestricted-zone particle filter falls below a predetermined covariance.

13. The system of claim 12 further comprising a probability calculation circuit to calculate the probability that the target is in the blind zone based on a number of missed gated detections during the concurrent propagating of the Kalman filter and the blind-zone particle filter, and to calculate the probability that the target is in the unrestricted zone based on a number of missed detections after the gated detection is received during the concurrent propagating of the blind-zone particle filter and the unrestricted-zone particle filter.

14. The system of claim 12 wherein the system controller initializes the Kalman filter with a mean and covariance calculated from statistics from the unrestricted-zone particle filter when the covariance falls below the predetermined covariance.

15. The system of claim 14 further comprising a random number generator, wherein the system controller further initializes the blind-zone particle filter with state information from the Kalman filter and uses the random number generator to randomly generate particles based on an error covariance matrix of the Kalman filter.

16. The system of claim 15 wherein the system controller further initializes the unrestricted-zone particle filter with unrestricted-zone particles received from the blind-zone particle filter, the unrestricted-zone particles comprising particles from outside the blind zone, and wherein the unrestricted-zone particle filter is gated and updated with measurements from one or more gated detections.

17. The system of claim 12 wherein the Kalman filter refrains from further propagating when the probability that the target is in the blind zone exceeds the threshold, and wherein the blind-zone particle filter and the unrestricted-zone particle filter are concurrently propagated after the gated detection is received during the propagating the blind-zone particle filter.

18. The system of claim 12 wherein the system further comprises a system tracking filter comprising a range-tracking filter, an azimuth-tracking filter, and an elevation-tracking filter, wherein the Kalman filter, the unrestricted-zone particle filter, and the blind-zone particle filter comprise a range Kalman filter, a range unrestricted-zone particle filter, and a range blind-zone particle filter which comprise the range-tracking filter.

19. The system of claim 18 wherein: the azimuth-tracking filter includes an azimuth Kalman filter, an azimuth unrestricted-zone particle filter, and an azimuth blind-zone particle filter; and
the elevation-tracking filter includes an elevation Kalman filter, an elevation unrestricted-zone particle filter, and an elevation blind-zone particle filter.

20. The system of claim 19 wherein:
the azimuth Kalman filter tracks the target while detections are received;
the azimuth blind-zone particle filter concurrently propagates with the azimuth Kalman filter while a probability that the target is in a blind zone exceeds a threshold; and
the azimuth unrestricted-zone particle filter concurrently propagates with the azimuth the blind-zone particle filter after a gated detection is received and while the probability does not exceed the threshold,
wherein the azimuth Kalman filter tracks the target when a covariance of the azimuth the unrestricted-zone particle filter falls below a predetermined covariance.

21. The system of claim 20 wherein:
the elevation Kalman filter tracks the target while detections are received;
the elevation blind-zone particle filter concurrently propagates with the elevation Kalman filter while a probability that the target is in a blind zone exceeds a threshold; and
the elevation unrestricted-zone particle filter concurrently propagates with the elevation the blind-zone particle filter after a gated detection is received and while the probability does not exceed the threshold,
wherein the elevation Kalman filter tracks the target when a covariance of the elevation unrestricted-zone particle filter falls below a predetermined covariance.

22. The system of claim 21 further comprising refraining from transitioning to tracking with the range, elevation and azimuth Kalman filters until the covariances of the range, elevation and azimuth unrestricted-zone particle filter each fall below one or more predetermined covariances.

23. A method of tracking a beam-aspect target comprising:
   tracking a target with a Kalman filter when the target is in an unrestricted zone;
   continuing to propagate the Kalman filter as the target enters a Doppler-blind zone;
   propagating a blind-zone particle filter when the target is in the Doppler-blind zone; and
   propagating an unrestricted-zone particle filter as the target emerges from the Doppler-blind zone and prior to switching back to tracking with the Kalman filter.

24. The method of claim 23 wherein tracking the target with the Kalman filter in an unrestricted zone comprises receiving gated detections indicating that the target is in the unrestricted zone, and
   wherein the method further comprises initializing the blind-zone particle filter with state information from the Kalman filter and randomly generated particles based on an error covariance matrix of the Kalman filter when a detection is not received within the gate while the target is in the unrestricted zone, the state information comprising at least target-location information.

25. The method of claim 24 further comprising during tracking the target with the Kalman filter while the target is in the unrestricted zone, continuing to propagate the Kalman filter concurrently with the propagating of the blind-zone particle filter.

26. The method of claim 25 further comprising continuing to propagate the Kalman filter concurrently with the blind-zone particle filter until a probability that the target is in the unrestricted zone, based on a number of missed detections, falls below a threshold.

27. The method of claim 26 further comprising:
   refraining from further propagating the Kalman filter when the probability exceeds the threshold; and
   continuing to propagate the blind-zone particle filter until a gated detection is received.

28. The method of claim 27 wherein after the gated detection is received, the method further comprises, prior to propagating the unrestricted-zone particle filter, initializing the unlimited-zone particle filter with unrestricted-zone particles from the blind-zone particle filter, the unrestricted-zone particles being outside the blind zone.

29. The method of claim 28 further comprising;
   continuing to propagate the blind-zone particle filter concurrently with the unrestricted-zone particle filter until a gated detection is received and a covariance of particles of the unrestricted-zone particle filter is below a predetermined covariance threshold, and
   when the covariance is below the predetermined covariance threshold, initializing the Kalman filter with a mean and covariance calculated from statistics from the unrestricted-zone particle filter.

30. The method of claim 29 further comprising:
   calculating a probability that the target is in the unrestricted zone based on a number of missed gated detections; and
   when the probability falls below the threshold, refraining from further propagating the unrestricted-zone particle filter and continuing propagating the blind-zone particle filter.

31. The method of claim 23 wherein the Kalman filter comprises a minimal mean-square-error (MSE) filter, and the particle filters comprise Bayesian tracking filter implemented without restriction on linearity of Gaussian statistics.

* * * * *